United States Patent [19]
Douglas et al.

[11] Patent Number: 4,813,503
[45] Date of Patent: Mar. 21, 1989

[54] METHOD AND APPARATUS FOR PREPARING A BLENDED PRODUCT CHARGE

[75] Inventors: Ellwood S. Douglas, Orinda; Oren A. Mosher, Castro Valley, both of Calif.

[73] Assignee: Package Machinery Company, Stafford Springs, Conn.

[21] Appl. No.: 200,753

[22] Filed: May 31, 1988

[51] Int. Cl.⁴ .................. G01G 13/00; G01G 19/22; G01G 13/02
[52] U.S. Cl. .................. 177/25.18; 177/70; 177/123
[58] Field of Search .............. 177/25.18, 70, 123

[56] References Cited

U.S. PATENT DOCUMENTS 4,522,274  6/1985  Konishi et al. ............... 177/25.18

Primary Examiner—George H. Miller, Jr.
Attorney, Agent, or Firm—McCormick, Paulding & Huber

[57] ABSTRACT

A method and apparatus for preparing a blended product charge includes a combinatorial weigher which receives a major product and a fill-to-cutoff weigher which receives a minor product. A controller selects a minor constituent product weight and then combinatorially searches through available major constituent product weighing scales for the combination of major product weighing scales which together with the minor product weighing scale yields a product charge nearest in weight to a target weight.

11 Claims, 2 Drawing Sheets

METHOD AND APPARATUS FOR PREPARING A BLENDED PRODUCT CHARGE

TECHNICAL FIELD

This invention relates to the field of weighing systems and more particularly to a method and apparatus for forming a product charge blended from discrete products.

BACKGROUND

Weighing systems for producing a product charge of precise weight are well known in the art and include systems that employ one of several combinatorial weighing techniques. In general, these mechanisms obtain a precise weight product charge by combining the contents of a plurality of buckets or hoppers, each of which contains a portion of the product charge. A controller reads the weight of each hopper, searches for the hopper weight combination which most closely approximates the desired weight, and subsequently dumps the contents of the corresponding hoppers.

Known combination weighing devices include the weighing apparatus disclosed in U.S. Pat. No. 4,515,231. That apparatus is characterized by a serial weighing operation in which articles are first provided to a plurality of fill-to-weight cutoff pool hoppers. After the weight of the product charges in the pool hoppers has been determined, the contents thereof are fed to corresponding weighing hoppers. The weighing of each of the weighing hoppers is then measured and a computer determines that combination of hoppers whose weight sum is equal or closest to a desired product charge weight. The U.S. Pat. No. 4,515,231 apparatus is most useful in handling light products or products apt to cling together in bunches. However, that apparatus is burdened by two discrete weighing operations. Moreover, the speed of operation of the combinatorial weights is necessarily limited by the filling speed of the fill-to-weight cutoff pool hoppers.

U.S. Pat. No. 4,418,771 discloses a combination weighing method and apparatus wherein quantities of the product of targeted weight are distributed to a plurality of scale controlled hoppers for accurate weighing. The weighed product charge is fed from each of the scale controlled hoppers to a plurality of storage cups associated with each of the hoppers and the product weight associated with each storage cup is registered. Specific combinations of storage cups are tested to determine whether the combined product weights add to make the desired weight within acceptable limits. The method and apparatus is characterized by a controller which will examine only a subset of hoppers rather than all of them to find a combination which will provide the desired weight product charge. If no combination produces a total product charge within selected weight limits, the controller will broaden the limits and repeat the cycle.

Known combinatorial weighing systems which will generate a product charge from two or more different articles include the weighing system disclosed in U.S. Pat. No. 4,473,126. Disclosed therein is a weighing system which includes a separate conventional combination weigher for each of the different articles which comprise the product charge. U.S. Pat. No. 4,549,617 teaches a combinatorial weighing system having a method of setting a target value (weight or number) for each of the component articles and supplying a plurality of combinatorial weighing machines. For each category of articles and from all combinations of the weighing machines, a controller determines the best combination therefrom whose total value (weight or number) is equal to the target value set for that category.

The combinatorial weighing method disclosed in U.S. Pat. No. 4,522,274 obtains a product charge having a mixture of articles of different categories wherein the articles in each category are contained in the mixture at a number ratio approximately equal to a target number. The method includes the steps of setting a number for each category to provide a number ratio closest to a target category number ratio, and measuring the total weight of a primary mixture obtained by extracting the set number of articles in each category and mixing these articles. If the weight of the primary mixture is initially outside of a minimum, a controller computes the weight difference between the primary mixture and target weight and provides supplemental articles to make up the short fall. The method provides for uniformity in the product weight to target number ratio as opposed to component distribution.

The combination weighing device taught in U.S. Pat. No. 4,388,975, simultaneously weighs a plurality of articles in weighing balances and a controller which selects a plurality of the weighing balances to comprise a total weight of articles within a predetermined range. The device is characterized by a controller which causes one or more of the specified weighing balances to always enter into the selected combination to insure that each package contains articles from selected weighing balances.

In the commonly owned U.S. Pat. No. 4,678,046, there is disclosed a combination weighing apparatus for two combined products which is characterized by one or more combinatorial weighing apparatus that separately provide the product constituents of a blended product charge. The apparatus disclosed therein is particularly useful in those instances where the product ratios are approximately even, such as multicomponent dog foods, where each product constituent comprises generally between 40 and 60% of the total weight. Existing combinatorial weighers for producing blended product charges are most cost effective in those applications where the product component weight ratios are approximately equal. However, with many blended products the minor constituent comprises only a small fraction (approximately 10%) of the product charge weight. Weighing systems which employ a combinatorial weigher for each major and minor product constituent under-utilize the minor constituent weigher and are, therefore, unnecessarily expensive.

For those situations where product preblending is not possible, it would be advantageous to have a combinatorial weigher for preparing a blended or multi-component product charge which is inexpensive and simple to construct, which is cost effective, which can be adapted to existing combination weighers and which avoids a separate combination weigher for each product. The present invention is drawn to such a weighing system.

SUMMARY OF ETHE INVENTION

An object of the present invention is to provide a simple and inexpensive weighing system for preparing a product charge having more than one constituent product.

According to the present invention, a combinatorial weighing system for preparing a charge of blended products includes a first product feed means which delivers combinational quantities of a first product to first product scales without precise metering. A second product feed means delivers a metered amount of second product to a second scale. A controller that is responsive to weight signals from the first and second product weighing scales selects a combination of the first product weighing scales which, together with the second product weighing scale, yields a charge of product near in weight to the target scale. A discharge apparatus dumps the products in the selected combination of first product scales and second product scales together to form the charge of blended first and second products.

DESCRIPTION OF THE PREFERRED EMBODIMENT

Figure 1:
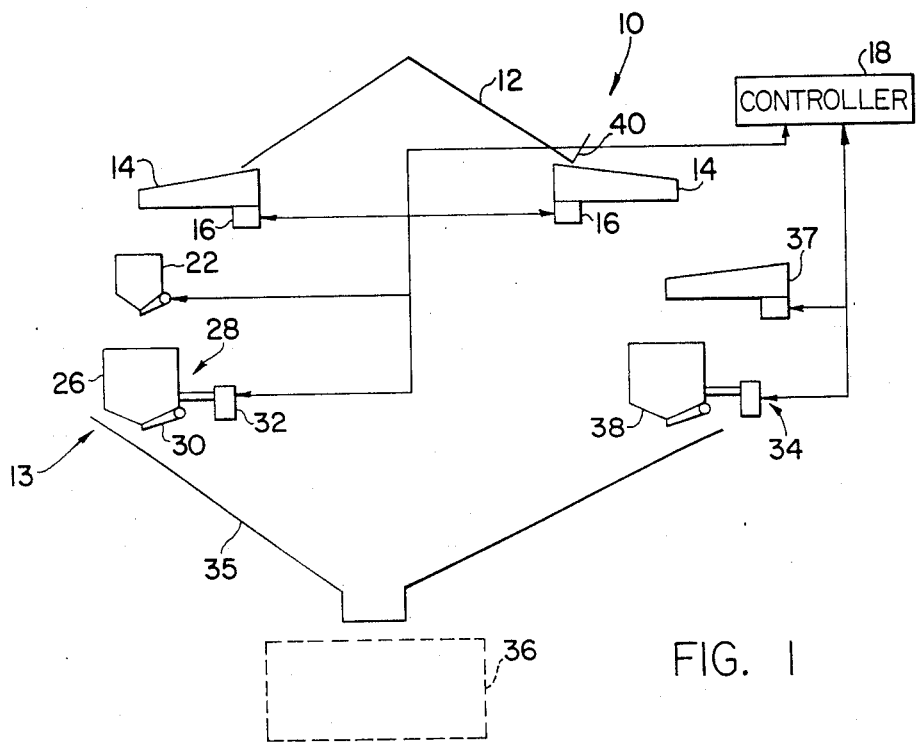
FIG. 1 is a simplified schematic illustration of a weighing system according to the present invention.

According to FIG. 1 there is illustrated in a simplified schematic format a weighing system 10 provided according to the present invention for preparing a product charge comprised of more than one product constituent. The system 10 may be used, for example, to make up product charges of extruded snacks, potato chips, pretzels, candies, dog food, or ethe like, having more than one constituent for packing in a package such as a pillow-type bag. Alternatively, the system can blend a minor component, such as raisins, with a major component such as bran flakes, to form a product charge of raisin bran cereal for packaging in boxes.

The major or primary constituent product (bran flakes for example) is received at a distributor 12, typically conical in shape which is part of a maojr constituent combinatorial weigher 13 commonly referred to as a "class 0" type weigher. the main or major constituent product is distributed to a plurality of product conveying or feeding devices, such as devices 14 arranged in a circular array at the lower edge of the distributor. The feeding devices include conventional vibrator mechanisms 16. The amount of product provided to each of these devices is sufficient to keep the devices supplied with product at a given level at all times. In a conventional manner, a controller 18 coarsely meters production in the devices 14 to the respective accumulator hoppers 22. On demand, the contents of a given accumulator hopper is provided to a corresponding bucket 26 or hopper of a weighing scale 28. Each weighing scale weighs the product charge and provides signals indicative thereof to controller 18. Each scale has a door 30 which will open or close by means of an actuator 32 in response to signals received from the controller. As described hereinafter, the weighing system of FIG. 1 algorithmically determines a combination of scales 30 whose summed contents constitute the final amount of the major constituent for the product charge.

The weighing system 10 is characterized by a fill-to-cutoff weigher 34 which is a source of a second or minor constituent product in precisely metered amounts, such as raisins in the present example. For those applications where pre-blending of the minor constituent with the major constituent is unacceptable (e.g. raisins in raisin bran cereal or marshmallows in packaged hot chocolate), it is necessary to provide a minor constituent weigher apparatus which works in concert with the weigher 13 to form a product charge of predetermined weight. Ultimately, the contents of the selected scales are dumped to an output collection chute 35 for packaging by a packaging machine shown generally in phantom at 36 and not part of the present invention.

The minor constituent fill-to-cutoff weigher 34 (class 1 type weigher) includes product conveyor device 37 which supplies the minor constituent product from a source (not shown) to a scale 38. The conveyor device is kept filled with minor constituent product. In the preferred embodiment, product normally provided from conveyor device 14 to scale 38 is obstructed by blocking mechanism 40, scale 38 measures the weight of product therein and provides signals indicative thereof to the controller 18. Typically, the product source to weigher 34 is normally a side vibrator feed but product can also be supplied from an auxiliary central radial feeder if the infeed to the device 38 can be isolated. It if preferable that the scales used be configurable either as a class 0 scale (scale 28) or as a class scale (scale 38), with the controller 18 appropriately modified.

Figure 2:
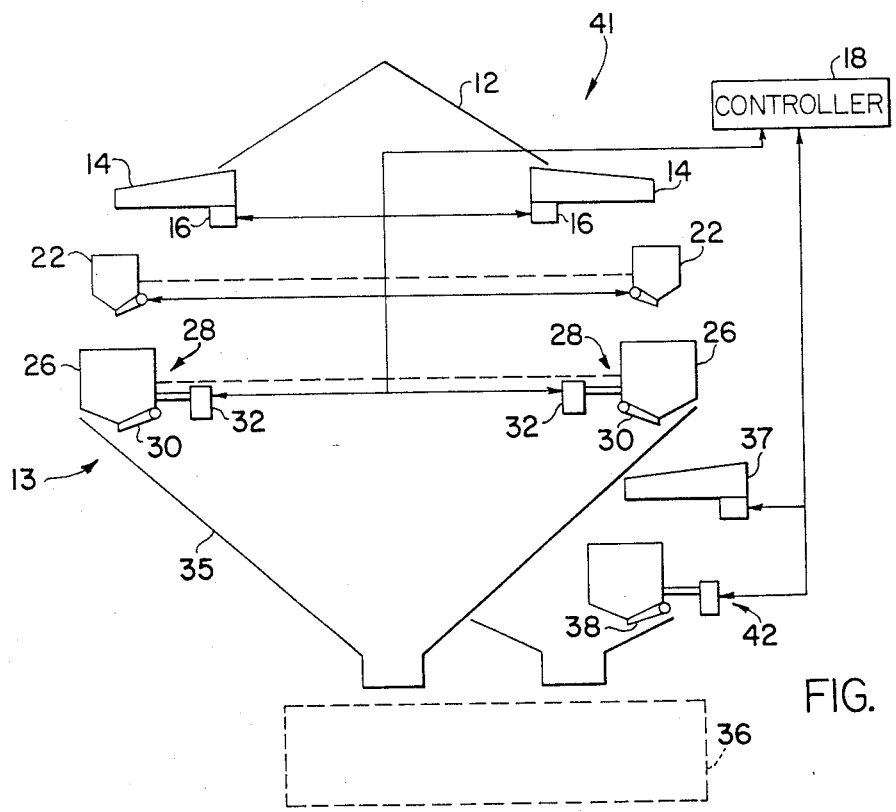
FIG. 2 illustrates an alternative embodiment of the weighing system of FIG. 1.

Although FIG. 1 illustrates only one fill-to-cutoff weigher, those skilled in the art will note that more than one fill-to-cutoff weighers may be employed to provide other minor product constituents as are required by the particular application. The fill-to-cutoff weigher 34 is characterized by closed loop operation wherein controller 18 receives feedback indicative of the weight of the product charge. Weigher 13 stands in contradistinction to weigher 34, as product is received for a preset time period ("open loop" operation) in a manner described in the commonly owned U.S. Pat. No. 4,534,428 entitled "Vibratory Feeder Control For A Weighing System" and incorporated herein by reference. For the embodiment of FIG. 1 the number of minor constituent weighers 34 can be easily changed by (1) incorporating blocking mechanism 40 in the corresponding major constituent conveying device 14, (2) removing the appropriate hopper 22, (3) incorporating conveying device 37 and (4) reprogramming the controller to accommodate the change in scale designation. An alternative weighing system 41 is shown in FIG. 2. The weighing system 41 is characterized by a weigher 42 configued separate from weigher 13. In all other aspects the weighing system is the same as the system 10 described hereinabove.

Since fill-to-cutoff weighers require more time to receive and weigh the specified weight product charge than does a combination weigher, a plurality of fill-to-cutoff scales and refill controls are configured with weigher 13 to allow the weighing system 10 to operate at the increased speed of the combination weigher 13. Moreover, the weighing system 10 can be used to form a product charge having a plurality of minor constituents, each having a corresponding plurality of weighing scales. The present invention also encompasses those applications where the larger rather than smaller product constituent is delivered by the fill to cutoff scales. Those skilled in the art will note that modifications to the preferred embodiment can readily be made as required for these applications.

In addition, the weighing system 10 can be configured to operate in a "multiple shift" manner. As is well known in the art, multiple shifted operation of the combination weigher entails weigher operation such that the product charge forming time period is less than the time needed for a particular hopper to complete a fill and dump cycle. As a result, not every hopper is available for every cycle of the combination weigher. In a similar manner, the weighing system 10 can be configured to operate in multiple shift operation by appropriate conventional modification to the controller and inclusion of sufficient fill-to-cutoff and combination scales to operate at the desired speed.

Figure 3:
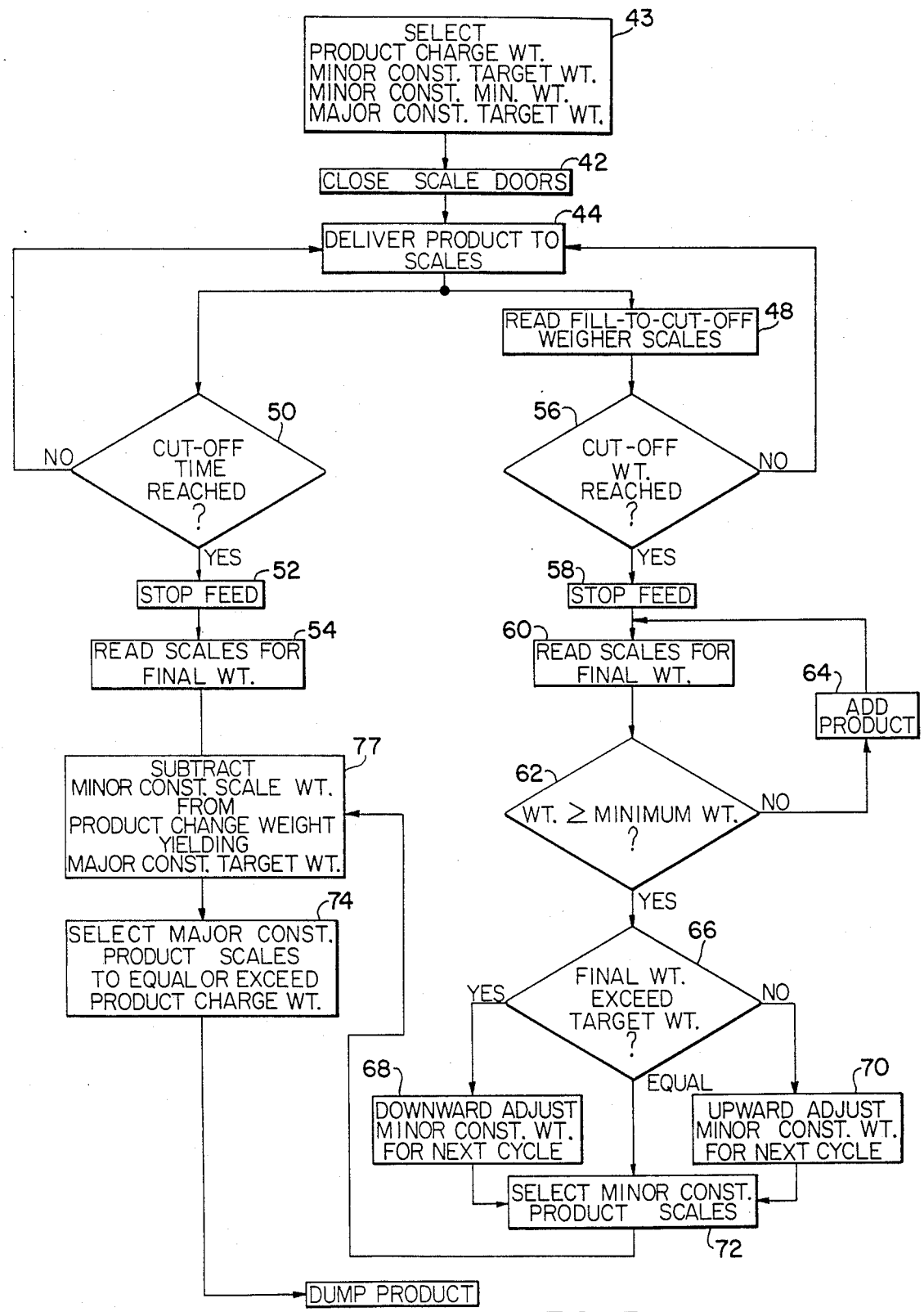
FIG. 3 is a simplified block diagram illustrating an algorithm used with the weighing system of FIG. 1.

FIG. 3 is a simplified block diagram of an algorithm for the controller of FIG. 1. The controller is conventional, and includes such hardware and software as is appropriate for performing the functions detailed herein. At the start of a product charge forming sequence, shown symbolically at 43, the following weight parameters must be specified: product charge, minor constituent target weight, minor constituent minimum weight. The major constituent target weight is calculated from the difference between the product charge weight and the minor constituent target weight. Open doors on buckets in both weigher 13 and weigher 34 are closed (block 42) in response to signals received from the controller. The major constituent product is delivered from product feed devices (e.g. devices 14 in FIG. 1) to the scales in weigher 13 (Block 44). The combination weigher 13 typically provides major constituent product to the scales for a timed period or by adjusting the amplitude of the vibration of the vibrator mechanisms 16. Once that period has elapsed (block 50) and product feed has stopped (block 52) each scale provides signals to the controller indicative of the final product weight in that scale.

Similarly, constituent product is delivered to the weigher 34. The controller delays measuring scale weight for a period of time called "recovery delay" which compensates for the fall time of the product as well as the vibration induced by scale door closing (Block 48). The controller continuously receives signals from each of the scales indicating product weight and compares that weight to a preselected cutoff weight value (block 56). Once the controller determines that the cutoff weight value for that scale has been reached (block 58), the feed vibrator associated with the product conveying device is stopped. For some products, product flow may also be stopped by a conventional cutoff paddle on the end of the vibrator. The controller determines the final product weight (block 60) only after waiting a period of time known as a "fall delay". This delay is necessary to allow product to settle into the scale.

For the fill-to-cutoff weigher 34, the product weight in scale 38 is compared to a minimum weight to determine if the amount of product exceeds a minimum value (block 62). Only when the product weight of the scale exceeds the minimum value is that scale included by the controller in the selection process. If the measured weight in a scale is below the minimum value, the vibrator will be restarted to add product (block 64) for a period of time whose duration is either externally selected or one calculated on the known product feed time from previous cycles.

As an example, if it is desired to have a fill-to-cutoff weigher fill each bucket to a product weight of 80 grams with a minimum weight of 70 grams, and 1.5 second average feed time for that weight on previous cycles, the weigher will deliver approximately 1/20th of a gram per millisecond. If the final weight measured is only 60 grams, and if the fill-to-cutoff weigher has a minor constituent product minimum weight of 70 grams, then approximately 10 grams are needed to achieve the minimum weight. A predicted product fill would take 200 milliseconds to complete product infeed at 1/20th of a gram per millisecond. After the fall delay period, the weight of the product in the bucket is again measured by the scales and presented to the controller. The weight of product in the bucket is not measured during refill because the feed times are usually less than the product fall time from vibrator to bucket. Typically, the minimum feed time is needed to prevent activation of the vibrator for times less than the vibrator's mechanical reaction time, generally between 80 and 100 milliseconds.

A weighing system provided according to the present invention provides for improved efficiency, since the acceptable product charge weight for the "class 0" or combinatorial weigher 13 is adjustable depending on the minor constituent product weight. Once the minor constituent product final weight is obtained, indicated symbolically at block 66, FIG. 3, that value is compared with the minor constituent product target weight to see if a change in cutoff weight is necessary. If the final weight exceeds the minor constituent target weight then the minor component cutoff weight will be adjusted downward (Block 68). This adjustment on subsequent weigh cycles corrects for the fact that extra product was "in the air" after the feed device is stopped. If the final weight is below the minor constituent target weight, then the cutoff weight is adjusted upwards (Block 70).

Once a minor consituent scale has been selected (Block 72), the product weight in that scale is subtracted (Block 77) from the product charge weight to form the major constituent target weight for this dump cycle. The controller 18 performs a conventional combination selection cycle on the "class 0" major constituent scales, and selects the group of major consituent scales (Block 74) at or above the calculated major constituent target weight for this dump cycle. Finally, the controller will dump the major and minor component scales (block 76) to form the blended product charge.

Moreover, a weighing system provided according to the present invention provides automatic adjustment of feeding device vibrator amplitude to insure that a minor constituent weighing bucket is available on each dump cycle. Theoretically, a fill-to-cutoff weigher having four weighing buckets could be utilized at the rate of approximately 18 times per minute per bucket or a total of 72 dumps/minute. However, during the operation of the system product remains in the buckets and the buckets must be "tared" approximately every 2 minutes. The "tare" process involves weighing an empty bucket to compensate for the product which sticks to the sides and bottom of the bucket and remains therein. In "multiple shift" operation each refill results in at least one scale not available for dumping for that cycle. As a result, the number of dumps per minute is actually smaller. With a weighing system provided according to the present invention, the controller provides for setting up a "ready time" which is subtracted from the theoretical fill-tocutoff time to give a target fill-to-cutoff weigher cycle time. The theoretical fill-to-cutoff time is calculated by dividing the desired product discharges per minute (in this example, 72) by the number of class "1" scales less 1. For example, with four class 1 scales the desired fill time is 24 times/minute not 18 times/minute. One weigher is kept in reserve to accommodate for the "misses" caused by tare cycles. The ready time is a further safety factor to guarantee that a "class 1" weigher is available on each cycle. If this cycle time exceeds the maximum desired cycle time, (i.e. bucket not ready soon enough) then the vibrator amplitude is increased by the controller. Those skilled in the art will also note that the vibrator amplitude may be adjusted downward to be just within the maximum desired cycle time, thereby saving energy and mechanical wear on the systems' components.

Similarly, although the invention has been shown and described with respect to the preferred embodiment thereof, it should be understood by those skilled in the art that various other changes, omissions, and additions thereto may be made therein without departing from the spirit and scope of the invention.

We claim:

1. A weighing system for preparing a charge of blended products closely approximating a predetermined target weight comprising:
    a plurality of first product weighing scales to receive and weigh a set of first product quantities and to generate weight signals representing the weight of first product in each scale;
    a first product feed means for open loop delivery of individual quantities of the first product to the first product scales;
    a second product weighing scale to receive and weigh a second product quantity and to generate a weight scale representing the weight of second product in the scale;
    a second product feed means for closed loop delivery of a metered quantity of second product to the second product scale in response to the weight signal;
    control means responsive to the weight signals from the first and second product weighing scales for selecting a combination of the first product weighing scales which, together with the second product weighing scale, yields a charge of product near in weight to the target weight; and
    discharging means for dumping products in the selected combination of first product scales and the second product scale together to form the charge of blended first and second products.

2. A weighing system as defined in claim 1 wherein the control means includes;
    arithmetic means responsive to the weight signal from the second product scale for subtracting the second product weight from the target weight to establish a subtarget weight; and
    search means responsive to the weight signals from the first product scales for selecting a combination of the first product scales which yields a weight of first product near in weight to the subtarget weight.

3. The weighing system of claim 1 further comprising:
    a third product weighing scale to receive and weigh a third product quantity and to generate a weight signal representing the weight of the third product in the scale; and
    a third product feed means for closed looped delivery of a metered quantity of third product to the third product scale in response to the weight signal;
    said control means further responsive to weight signals from the third product weighing scales for selecting a combination of the first product weighing scales which together with the second and third product weighing scales, yields a charge of product near in weight to the target weight.

4. The weighing system of claim 1 wherein said first and second product weighing scales each comprise weighing scales configurable for both open or closed loop operations.

5. The weighing system of claim 4 wherein said control means, in response to external signals, selectively configures said weighing scales for both open and closed loop operations.

6. The weighing system of claim 1 wherein said control means receives external signals indicative of selected product charge weight, minor constituent target weight, minor constituent minimum weight, and major constituent target weight, and provides in response thereto signals that enable product delivery to said first and second weighing scales, generate said weight signals, adjust said minor constituent weight in dependence on the magnitude of said second weight signals, subtract said minor constituent scale weight from said product charge weight generating a major constituent target weight and selecting major constituent product scales to equal or exceed the magnitude of said product charge weight.

7. A multiple shifted weighing system for cyclically preparing, during a product charge forming time period, charges of blended products each closely approximating a predetermined target weight, said system comprising:
    a plurality of first product weighing scales to receive and weigh a set of first product quantities during a first time period and to generate weight signals representing the weight of first product in each scale;
    a first product feed means for open loop delivery of individual quantities of the first product to the first product scales;
    a plurality of second product weighing scales each to receive and weigh a second product quantity during a second time period and to generate a weight signal representing the weight of second product in the scales;
    a second product feed means for closed loop delivery of a metered quantity of second product to the second product scales in response to the corresponding weight signals, the product charge forming time period no longer than the lesser in length of said first and second time periods;
    control means, responsive to the weight signals from the first and second product weighing scales, for selecting a combination of the first product weighing scales which, together with one of the second product weighing scales, yields a charge of product near in weight to the target weight; and
    discharging means for dumping products in the selected combination of first product scales and the second product scales together to form a charge of blended first and second product.

8. The weighing system of claim 7 wherein said first time period exceeds said second time period.

9. The weighing system for claim 7 wherein said second time period exceed said first time period.

10. A method for preparing a charge of blended products closely approximating a predetermined target weight, comprising the steps of:
proving first product quantities in open loop delivery to a plurality of first product weighing scales;
generating weight signals representing the weight of first product in each of said scale;
providing a second product quantity to a second product scale;
generating a weight signal representing the weight of said second product in said second product scale;
selecting in response to the weight signals from the first and second product weighing scales a combination of the first product weighing scales which, together with the second product weighing scale yields a charge of product near in weight to the target weight; and
discharging said products in the selected combination of first product scales and the second product scale to form the charge of blended first and second products.

* * * * *

UNITED STATES PATENT AND TRADEMARK OFFICE
CERTIFICATE OF CORRECTION

PATENT NO.  :  4,813,503
DATED       :  March 21, 1989
INVENTOR(S) :  Ellwood S. Douglas and Oren A. Mosher It is certified that error appears in the above-identified patent and that said Letters Patent is hereby corrected as shown below:

Column 1

Line 11, change the heading "BACKGROUND" to read--BACKGROUND OF THE INVENTION--.

Column 2

Line 43, delete "40" and substitute--40%--.

Line 63, in the heading "SUMMARY OF THE INVENTION" delete "ETHE" and substitute--THE--.

Column 3

Line 27, after "1" insert--,--.

Line 33, delete "ethe" and substitute--the--.

Line 41, delete "maojr" and substitute--major--.

Line 43, delete "the" and substitute--The--.

Column 4

Line 3, delete "e.g" and substitute--e.g.--.

Line 24, delete the second occurrence of "if" and substitute--is--.

Line 50, delete "configued" and substitute--configured--.

UNITED STATES PATENT AND TRADEMARK OFFICE
CERTIFICATE OF CORRECTION

PATENT NO. : 4,813,503

DATED : March 21, 1989

INVENTOR(S) : Ellwood S. Douglas and Oren A. Mosher

It is certified that error appears in the above-identified patent and that said Letters Patent is hereby corrected as shown below:

Line 65, delete "fill to cutoff" and substitute--fill-to-cutoff--.

Column 6

Line 66, delete "fill-tocutoff" and substitute--fill-to-cutoff--.

Column 7

Line 1, delete "class" and substitute--"class--.

Line 2, delete ""1"" and substitute--1"--.

Line 35, delete "scale" and substitute--signal--.

Line 52, delete ";" and substitute--:--.

Column 9

Line 1, delete "for" and substitute --of--.

Signed and Sealed this

Seventeenth Day of October, 1989

Attest:

DONALD J. QUIGG

Attesting Officer      Commissioner of Patents and Trademarks